US009612699B2

(12) United States Patent
Lin et al.

(10) Patent No.: US 9,612,699 B2
(45) Date of Patent: Apr. 4, 2017

(54) CAPACITIVE TOUCH PANEL

(71) Applicant: Raydium Semiconductor Corporation, Hsinchu (TW)

(72) Inventors: Yi-Ying Lin, Hualien (TW);
Kuan-Ming Lin, Hsinchu (TW);
Hsin-Wei Shieh, New Taipei (TW);
Kun-Pei Lee, Zhunan Township (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 14/795,094

(22) Filed: Jul. 9, 2015

(65) Prior Publication Data
US 2016/0011694 A1    Jan. 14, 2016

(30) Foreign Application Priority Data

Jul. 11, 2014    (TW) .............................. 103123913 A

(51) Int. Cl.
*G06F 3/044*        (2006.01)
(52) U.S. Cl.
CPC .... *G06F 3/044* (2013.01); *G06F 2203/04104* (2013.01)
(58) Field of Classification Search
CPC .................. G06F 2203/04104; G06F 3/044
See application file for complete search history.

(56) References Cited

U.S. PATENT DOCUMENTS

| 2010/0007626 A1* | 1/2010 | Lai ........................ G06F 3/044 345/174 |
| 2014/0111473 A1* | 4/2014 | Yang ...................... G06F 3/044 345/174 |
| 2014/0332361 A1* | 11/2014 | Huang ............... H03K 17/9622 200/5 A |
| 2015/0029134 A1* | 1/2015 | Liu ........................ G06F 3/044 345/174 |
| 2015/0169105 A1* | 6/2015 | Tung ..................... G06F 3/044 345/174 |

* cited by examiner

*Primary Examiner* — Andrew Sasinowski
*Assistant Examiner* — Chun-Nan Lin

(57) ABSTRACT

An on-cell capacitive touch panel is disclosed. Its laminated structure includes a LCD module, a touch sensing module, and a polarizing module. The touch sensing module is disposed on the LCD module. The polarizing module is disposed on the touch sensing module. The touch sensing module includes a touch sensor pattern having a single-layer ITO structure. The touch sensor pattern includes a first pattern unit and a second pattern unit which are the same and both have at least one first electrode, second electrode, and extending electrode. The first electrode is arranged along a first direction and the second electrode is arranged along a second direction. The first direction and second direction are vertical. The first electrode crosses the second electrode via a bridge structure. The extending electrode surrounds the first electrode and it is arranged along the first direction.

11 Claims, 8 Drawing Sheets

CAPACITIVE TOUCH PANEL

BACKGROUND OF THE INVENTION

Field of the Invention

This invention relates to a touch panel, especially to an on-cell capacitive touch panel capable of effectively inhibiting reverse signals and enhancing signal uniformity.

Description of the Related Art

In general, there are several different laminated structures of the capacitive touch panel. For example, in an on-cell capacitive touch panel, touch sensors are disposed on the outer surface of the glass of the display panel, so that display function and touch function can be integrally provided, and the laminated structure of the on-cell capacitive touch panel can become simpler. If the on-cell capacitive touch panel has no cover lens, the user can directly perform touch operation on the display panel.

Please refer to FIG. 1 and FIG. 2. FIG. 1 and FIG. 2 illustrate two different laminated structures of the on-cell capacitive touch panel respectively. The difference between the laminated structure 1 shown in FIG. 1 and the laminated structure 2 shown in FIG. 2 is that the laminated structure 1 shown in FIG. 1 includes cover lens 18 and optical clear adhesive (OCA)/optical clear resin (OCR) 16, but the laminated structure 2 shown in FIG. 2 does not.

It should be noticed that the laminated structure 2 shown in FIG. 2 having no cover lens 18 and OCA/OCR 16 can achieve the effects of simple laminated structure, reducing thickness, and saving costs; however, stronger reverse signals will be generated accordingly and multi-touch sensing performance of the on-cell capacitive touch panel will become poor.

For example, two touch points P1 and P2 in FIG. 3 are located at the upper left corner and the bottom right corner of the touch panel TP having the laminated structure 2 instead of being located at the same axis, the reverse signals are generated at a first location R1 and a second location R2 on the touch panel TP respectively, and the first location R1 and the second location R2 are located at the bottom left corner and the upper right corner of the touch panel TP; therefore, the reverse signals generated will not cancel out the touch signals of the two touch points P1 and P2. However, two touch points P3 and P4 in FIG. 4 are located at the same axis of the touch panel TP having the laminated structure 2, the reverse signals are generated at a third location R3 and a fourth location R4 on the touch panel TP respectively, and the third location R3 and the fourth location R4 will overlap the two touch points P3 and P4; therefore, the reverse signals generated will cancel out the touch signals of the two touch points P3 and P4, and the multi-touch sensing performance of the touch panel TP will become poor.

Therefore, a capacitive touch panel is provided to solve the above-mentioned problems.

SUMMARY OF THE INVENTION

A preferred embodiment is an on-cell capacitive touch panel. In this embodiment, the capacitive touch panel includes a laminated structure. The laminated structure includes a LCD module, a touch sensing module, and a polarizing module. The touch sensing module is disposed on the LCD module. The polarizing module is disposed on the touch sensing module. The touch sensing module includes a plurality of touch sensor patterns which are identical. A touch sensor pattern of the plurality of touch sensor patterns has a single-layer ITO structure. The touch sensor pattern includes a first pattern unit and a second pattern unit which are identical. The first pattern unit and the second pattern unit both include at least one first electrode, at least one second electrode, and at least one extending electrode. The at least one first electrode is arranged along a first direction and the at least one second electrode is arranged along a second direction. The first direction is perpendicular to the second direction. The at least one first electrode crosses the at least one second electrode via a bridge structure. The at least one extending electrode surrounds the at least one first electrode and the at least one extending electrode is arranged along the first direction.

In an embodiment, a width of the at least one first electrode is 100~400 um.

In an embodiment, a width of the at least one second electrode is 200~600 um.

In an embodiment, a width of the at least one extending electrode is 20~100 um.

In an embodiment, a distance between the at least one extending electrode and the at least one first electrode is 20~100 um.

In an embodiment, the bridge structure is located at centers of the first pattern unit and the second pattern unit.

In an embodiment, the at least one extending electrode extends from the at least one second electrode toward an edge of the touch sensor pattern along the first direction.

In an embodiment, the at least one extending electrode has single slope or multi-slope.

In an embodiment, a conductive material of the plurality of touch sensor patterns is indium tin oxide (ITO), nano silver, or carbon nanotube.

In an embodiment, the first direction is a horizontal direction and the second direction is a vertical direction, or the first direction is the vertical direction and the second direction is the horizontal direction.

In an embodiment, the at least one first electrode is a sensing electrode and the at least one second electrode is a driving electrode, or the at least one first electrode is the driving electrode and the at least one second electrode is the sensing electrode.

Another preferred embodiment is also an on-cell capacitive touch panel. In this embodiment, the capacitive touch panel includes a laminated structure. The laminated structure includes a LCD module, a touch sensing module, and a polarizing module. The touch sensing module is disposed on the LCD module. The polarizing module is disposed on the touch sensing module. The touch sensing module includes a plurality of touch sensor patterns. A touch sensor pattern of the plurality of touch sensor patterns has a single-layer ITO structure. The touch sensor pattern includes a first pattern unit and a second pattern unit which are symmetrical to a center of the touch sensor pattern. The first pattern unit and the second pattern unit both include at least one first electrode and at least two second electrodes. The at least one first electrode includes a first section and a second section. The first section is arranged along a first direction and the at least two second electrodes are arranged along a second direction. The second section is L-shaped and includes a horizontal part and a vertical part. The horizontal part crosses a second electrode of the at least two second electrodes and the horizontal part is coupled to the first section via a bridge structure. The vertical part extends to the center of the touch sensor pattern. The first direction is perpendicular to the second direction. The bridge structure in the first pattern unit and that in the second pattern unit are symmetrical to the center of the touch sensor pattern.

In an embodiment, a width of the first section and that of the horizontal part of the second section are 200~600 um.

In an embodiment, a width of the vertical part of the second section is 100~400 um.

In an embodiment, a width of the at least two second electrodes is 100~400 um.

In an embodiment, the touch sensor pattern and another touch sensor pattern adjacent to the touch sensor pattern along the first direction mirror each other.

In an embodiment, the touch sensor pattern and another touch sensor pattern adjacent to the touch sensor pattern along the second direction mirror each other.

In an embodiment, a conductive material of the plurality of touch sensor patterns is indium tin oxide (ITO), nano silver, or carbon nanotube.

In an embodiment, the first direction is a horizontal direction and the second direction is a vertical direction, or the first direction is the vertical direction and the second direction is the horizontal direction.

In an embodiment, the at least one first electrode is a sensing electrode and the at least two second electrodes are driving electrodes, or the at least one first electrode is the driving electrode and the at least two second electrodes are the sensing electrodes.

Compared with the prior arts, embodiments of the on-cell capacitive touch panel having well-designed touch sensor patterns described herein can effectively inhibit reverse signals and enhance signal uniformity without cover lens and optical clear adhesive (OCA)/optical clear resin (OCR); therefore, the multi-touch sensing performance of the on-cell capacitive touch panel can be enhanced.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A preferred embodiment of the invention is an on-cell capacitive touch panel.

Figure 1:
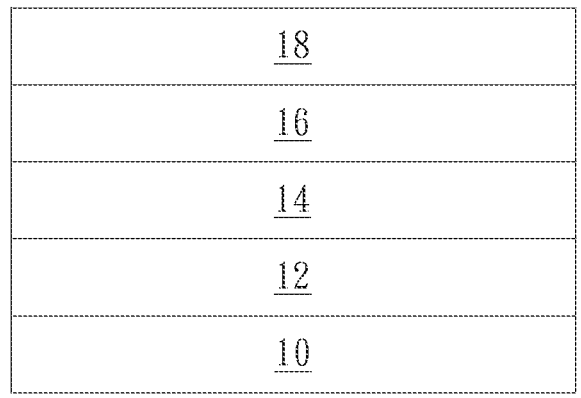
FIG. 1 and FIG. 2 illustrate two different laminated structures of the on-cell capacitive touch panel respectively.
Figure 2:
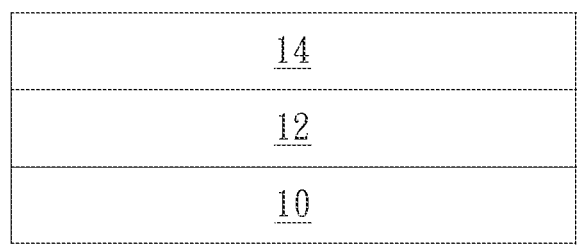
Figure 3:
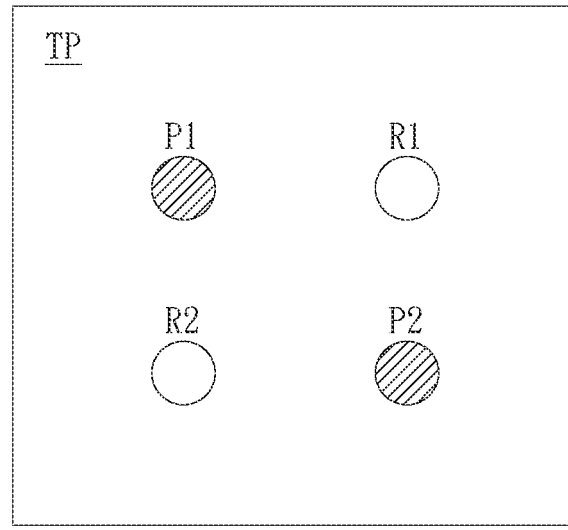
FIG. 3 illustrates the locations the reverse signals generated when two touch points are located at the upper left corner and the bottom right corner of the touch panel having the laminated structure.
Figure 4:
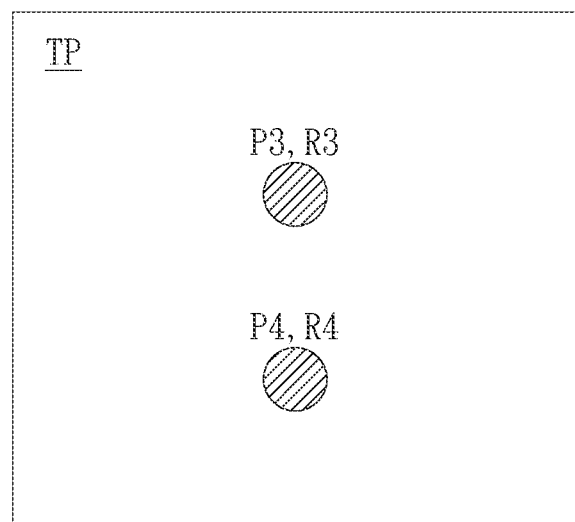
FIG. 4 illustrates the locations the reverse signals generated when two touch points are located at the same axis on the touch panel having the laminated structure.

In this embodiment, the laminated structure of the on-cell capacitive touch panel can have no cover lens and OCA/OCR as the laminated structure 2 shown in FIG. 2, but not limited to this.

As shown in FIG. 2, the laminated structure 2 includes a LCD module 10, a touch sensing module 12, and a polarizing module 14. The touch sensing module 12 is disposed on the LCD module 10; the polarizing module 14 is disposed on the touch sensing module 12. In fact, the polarizing module 14 can be a polarizer or polarizing film, but not limited to this.

Figure 5:
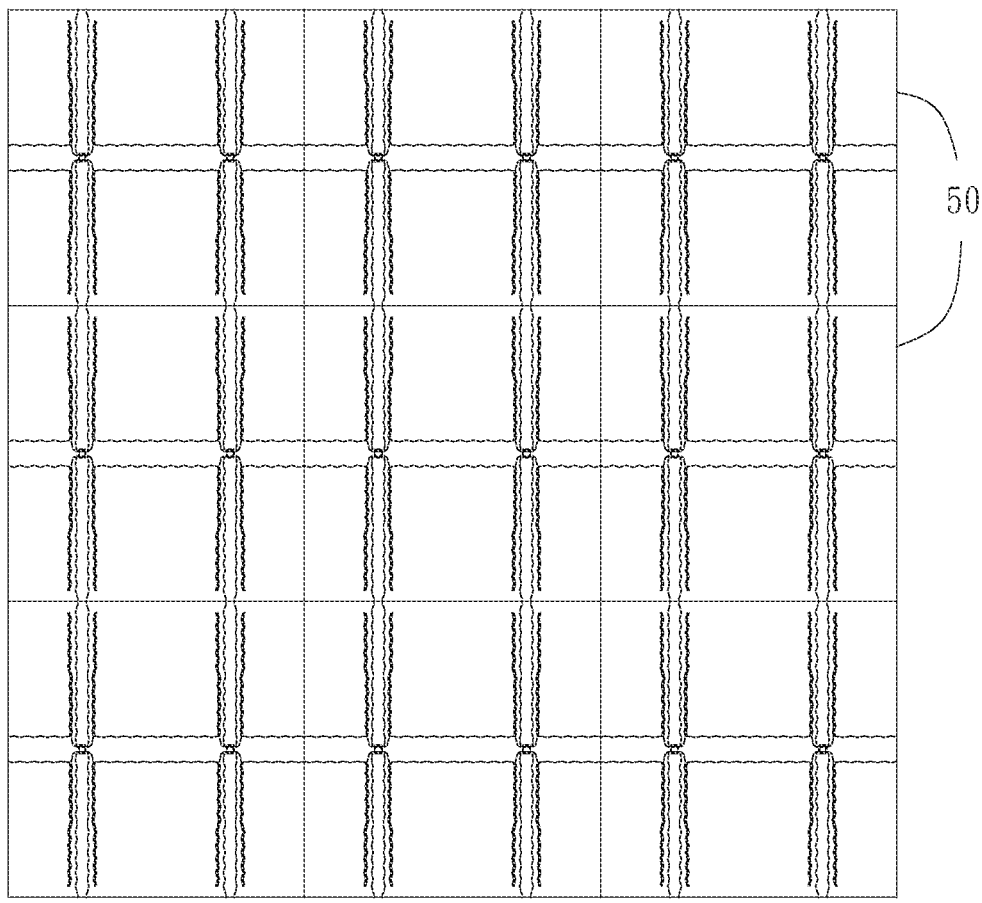
FIG. 5 illustrates a schematic diagram of the on-cell capacitive touch panel having the same touch sensor patterns in a preferred embodiment of the invention.

Please refer to FIG. 5. FIG. 5 illustrates a schematic diagram of the on-cell capacitive touch panel 5 having the same touch sensor patterns 50 in a preferred embodiment of the invention. As shown in FIG. 5, in the laminated structure of the on-cell capacitive touch panel 5, the touch sensing module includes nine same touch sensor patterns 50 arranged in a (3*3) type, but not limited to this. It should be noticed that geometric lines of the touch sensor patterns 50 shown in FIG. 5 are presented in a sawtooth form, but not limited to this. In fact, the geometric lines of the touch sensor patterns 50 shown in FIG. 5 can be presented in any lines or curves having different curvatures or curved forms or any other regular or irregular geometric lines without any limitations. It can be adjusted based on practical requirements.

In this embodiment, the touch sensor patterns 50 have a single-layer ITO structure. The conductive material of the touch sensor patterns 50 can be transparent thin-film conductive material such as indium tin oxide (ITO), nano silver, or carbon nanotube, but not limited to this. The touch sensor patterns 50 includes at least one first electrode arranged along a first direction and at least one second electrode arranged along a second direction, and the first direction is perpendicular to the second direction.

It should be noticed that the first electrode is a sensing electrode and the second electrode is a driving electrode, or the first electrode is a driving electrode and the second electrode is a sensing electrode. There is no specific limitation.

Figure 6:
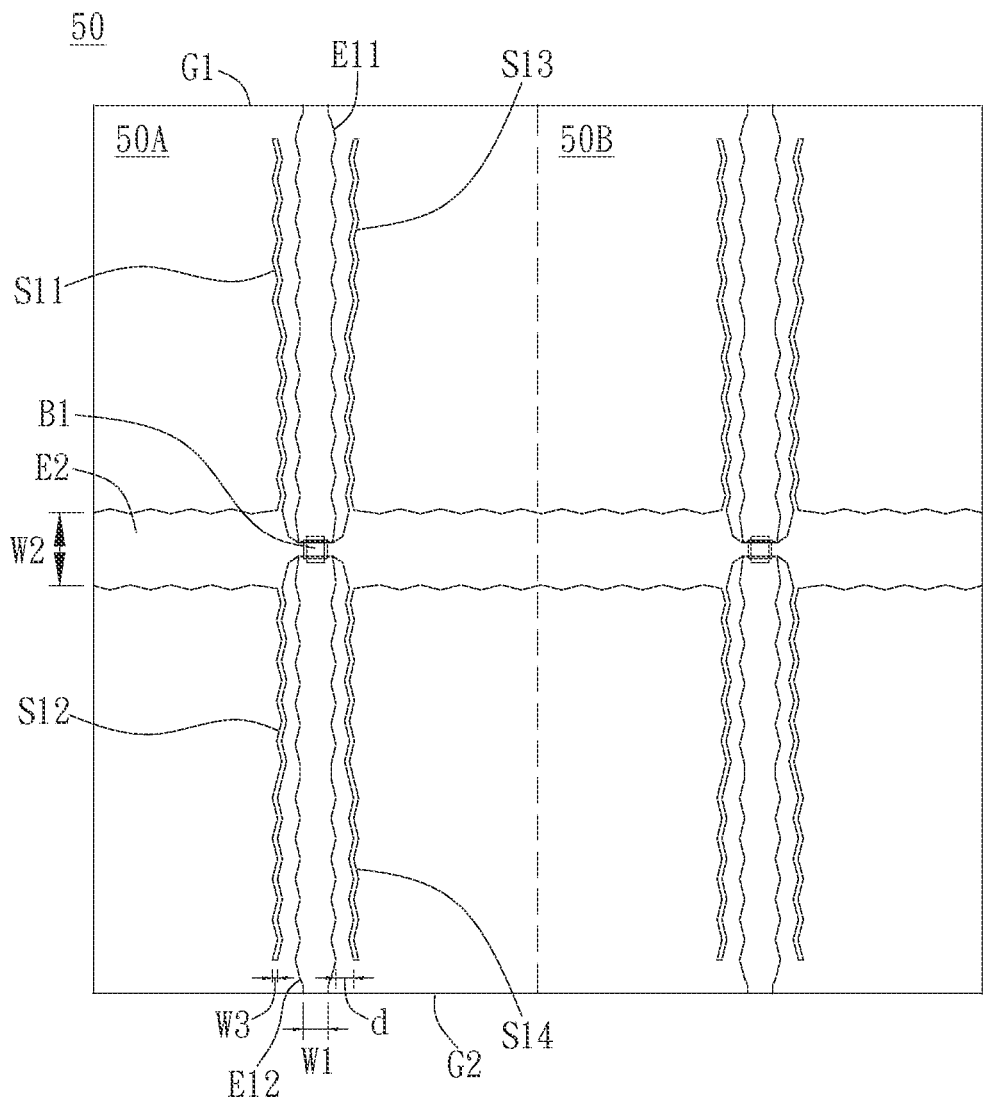
FIG. 6 illustrates a schematic diagram of the touch sensor pattern of FIG. 5.

Please refer to FIG. 6. FIG. 6 illustrates a schematic diagram of the touch sensor pattern 50 of FIG. 5. As shown in FIG. 6, the touch sensor pattern 50 includes a first pattern unit 50A and a second pattern unit 50B which are the same. Since the first pattern unit 50A and the second pattern unit 50B are the same, the first pattern unit 50A will be taken as an example introduced in detail as follows.

The first pattern unit 50A includes first electrodes E11~E12, a second electrode E2, and extending electrodes S11~S14. Wherein, the first electrodes E11~E12 are arranged along a first direction (the vertical direction); the second electrode E2 is arranged along a second direction (the horizontal direction). The extending electrodes S11~S14 surround the first electrodes E11~E12 and the extending electrodes S11~S14 are arranged along the first direction (the vertical direction). Obviously, the first direction (the vertical direction) is perpendicular to the second direction (the horizontal direction).

In this embodiment, the first electrodes E11~E12 are coupled above the second electrode E2 via a bridge structure B1 to cross the second electrode E2. The bridge structure B1 is located at the center of the first pattern unit 50A. The width W1 of the first electrodes E11~E12 can be 100~400 um, and the width W2 of the second electrode E2 can be 200~600 um, but not limited to this.

As shown in FIG. 6, the extending electrodes S11~S14 surrounding the first electrodes E11~E12 are arranged along the first direction (the vertical direction). More detail, the extending electrodes S11 and S13 extend upward from the second electrode E2 disposed at two sides of the first electrode E11 toward an edge G1 of the first pattern unit 50A, and a specific distance d will be maintained between the extending electrodes S11 and S13 and the first electrode E11 respectively. Similarly, the extending electrodes S12 and S14 extend downward from the second electrode E2 disposed at two sides of the first electrode E12 toward another edge G2 of the first pattern unit 50A, and the specific distance d will be maintained between the extending electrodes S12 and S14 and the first electrode E12 respectively.

In this embodiment, the width W3 of the extending electrodes S11~S14 can be 20~100 um; the specific distance d between the extending electrodes S11 and S13 and the first electrode E11 and between the extending electrodes S12 and S14 and the first electrode E12 can be 20~100 um, but not limited to this. In addition, the extending electrodes S11~S14 can have single slope or multi-slope without any specific limitations.

It should be noticed that the extending electrodes S11 and S13 extending upward toward the edge G1 of the first pattern unit 50A can extend to the edge G1 or only extend a specific length without any specific limitations. Similarly, the extending electrodes S12 and S14 extending downward toward the edge G2 of the first pattern unit 50A can extend to the edge G2 or only extend a specific length without any specific limitations.

Although the first electrodes E11~E12, the second electrode E2, and the extending electrodes S11~S14 of the touch sensor patterns 50 shown in FIG. 6 are presented in a sawtooth form, but not limited to this. In fact, the first electrodes E11~E12, the second electrode E2, and the extending electrodes S11~S14 shown in FIG. 6 can be presented in any lines or curves having different curvatures or curved forms or any other regular or irregular geometric lines without any limitations. It can be adjusted based on practical requirements.

Figure 7:
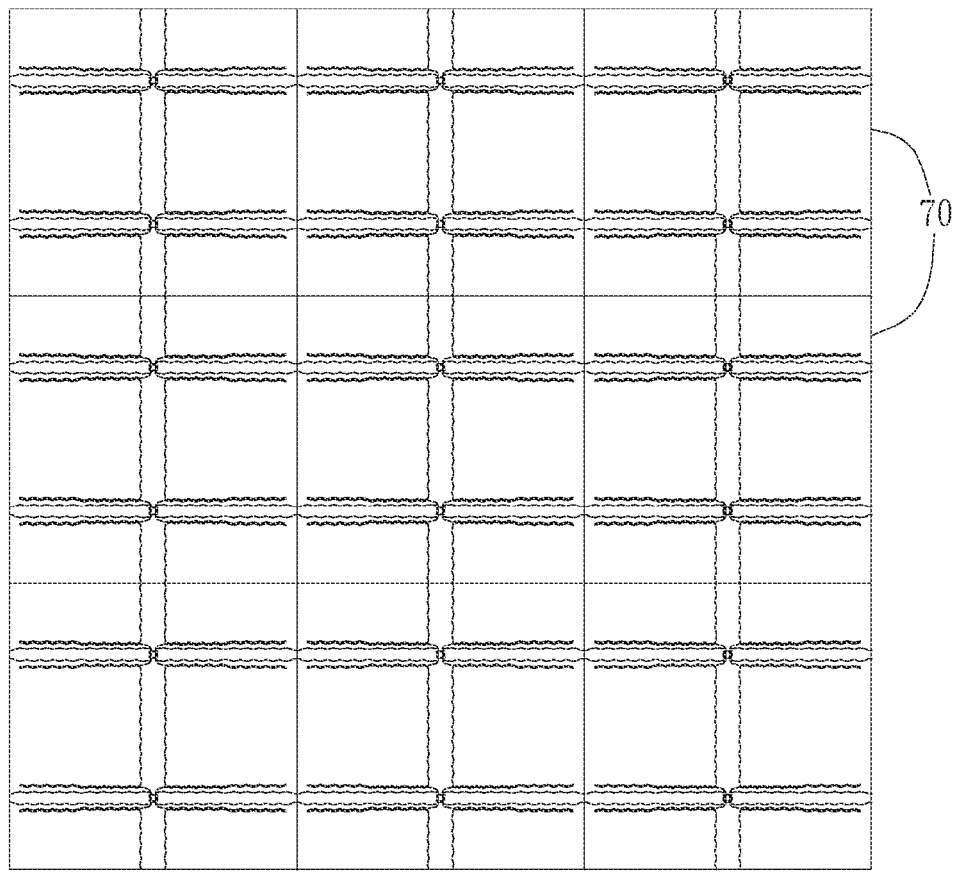
FIG. 7 illustrates a schematic diagram of the on-cell capacitive touch panel having the same touch sensor patterns in another preferred embodiment of the invention.

Then, please refer to FIG. 7. FIG. 7 illustrates a schematic diagram of the on-cell capacitive touch panel 7 having the same touch sensor patterns 70 in another preferred embodiment of the invention. As shown in FIG. 7, in the laminated structure of the on-cell capacitive touch panel 7, the touch sensing module includes nine same touch sensor patterns 70 arranged in a (3*3) type, but not limited to this. It should be noticed that geometric lines of the touch sensor patterns 70 shown in FIG. 7 are presented in a sawtooth form, but not limited to this. In fact, the geometric lines of the touch sensor patterns 70 shown in FIG. 7 can be presented in any lines or curves having different curvatures or curved forms or any other regular or irregular geometric lines without any limitations. It can be adjusted based on practical requirements.

In this embodiment, the touch sensor patterns 70 have a single-layer ITO structure. The conductive material of the touch sensor patterns 70 can be transparent thin-film conductive material such as indium tin oxide (ITO), nano silver, or carbon nanotube, but not limited to this. The touch sensor patterns 70 includes at least one first electrode arranged along a first direction and at least one second electrode arranged along a second direction, and the first direction is perpendicular to the second direction.

It should be noticed that the first electrode is a sensing electrode and the second electrode is a driving electrode, or the first electrode is a driving electrode and the second electrode is a sensing electrode. There is no specific limitation.

Figure 8:
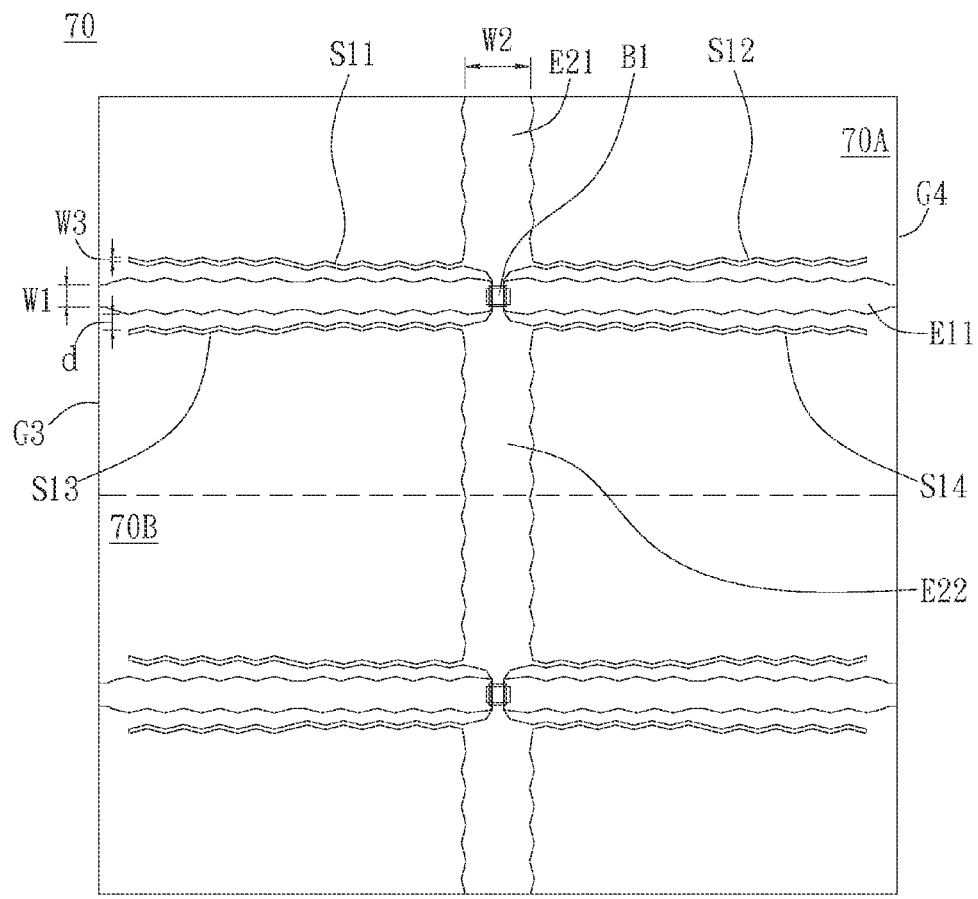
FIG. 8 illustrates a schematic diagram of the touch sensor pattern of FIG. 7.

Please refer to FIG. 8. FIG. 8 illustrates a schematic diagram of the touch sensor pattern 70 of FIG. 7. As shown in FIG. 8, the touch sensor pattern 70 includes a first pattern unit 70A and a second pattern unit 70B which are the same. Since the first pattern unit 70A and the second pattern unit 70B are the same, the first pattern unit 70A will be taken as an example introduced in detail as follows.

The first pattern unit 70A includes a first electrode E1, second electrodes E21~E22, and extending electrodes S11~S14. Wherein, the first electrode E1 is arranged along a first direction (the horizontal direction); the second electrodes E21~E22 are arranged along a second direction (the vertical direction). The extending electrodes S11~S14 surround the first electrode E1 and the extending electrodes S11~S14 are arranged along the first direction (the horizontal direction). Obviously, the first direction (the horizontal direction) is perpendicular to the second direction (the vertical direction).

In this embodiment, the second electrodes E21~E22 are coupled above the first electrode E1 via a bridge structure B1 to cross the first electrode E1. The bridge structure B1 is located at the center of the first pattern unit 70A. The width W1 of the first electrode E1 can be 100~400 um, and the width W2 of the second electrodes E21~E22 can be 200~600 um, but not limited to this.

As shown in FIG. 8, the extending electrodes S11~S14 surrounding the first electrode E1 are arranged along the first direction (the horizontal direction). More detail, the extending electrodes S11 and S12 extend leftward and rightward respectively from the second electrode E21 disposed above the first electrode E1 toward edges G3 and G4 of the first pattern unit 70A, and a specific distance d will be maintained between the extending electrodes S11 and S12 and the first electrode E1 respectively. Similarly, the extending electrodes S13 and S14 extend leftward and rightward respectively from the second electrode E22 disposed below the first electrode E1 toward edges G3 and G4 of the first pattern unit 70A, and the specific distance d will be maintained between the extending electrodes S13 and S14 and the first electrode E1 respectively.

In this embodiment, the width W3 of the extending electrodes S11~S14 can be 20~100 um; the specific distance d between the extending electrodes S11~S14 and the first electrode E1 can be 20~100 um, but not limited to this. In addition, the extending electrodes S11~S14 can have single slope or multi-slope without any specific limitations.

It should be noticed that the extending electrodes S11 and S13 extending leftward toward the edge G3 of the first pattern unit 70A can extend to the edge G3 or only extend a specific length without any specific limitations. Similarly, the extending electrodes S12 and S14 extending rightward toward the edge G4 of the first pattern unit 70A can extend to the edge G4 or only extend a specific length without any specific limitations.

Although the first electrode E1, the second electrodes E21~E22, and the extending electrodes S11~S14 of the touch sensor patterns 70 shown in FIG. 8 are presented in a sawtooth form, but not limited to this. In fact, the first electrode E1, the second electrodes E21~E22, and the extending electrodes S11~S14 shown in FIG. 8 can be presented in any lines or curves having different curvatures or curved forms or any other regular or irregular geometric lines without any limitations. It can be adjusted based on practical requirements.

In one embodiment, the laminated structure of the on-cell capacitive touch panel has no cover lens and OCA/OCR; however, since the on-cell capacitive touch panels 5 and 7 include the same touch sensor patterns 50 and 70 shown in FIG. 6 and FIG. 8 respectively, when the user touches the on-cell capacitive touch panel 5 or 7, the on-cell capacitive touch panel 5 or 7 can effectively inhibit reverse signals and enhance signal uniformity. Therefore, even multiple touch points are located at the same axis on the on-cell capacitive touch panel 5 or 7 and reverse signals are generated at the locations overlapping the touch points, since the strength of reverse signals is too low to cancel out the touch signals of the touch points, the touch signals of the touch points will not be canceled out and the multi-touch sensing performance of the on-cell capacitive touch panel 5 and 7 can be effectively enhanced.

Figure 9:
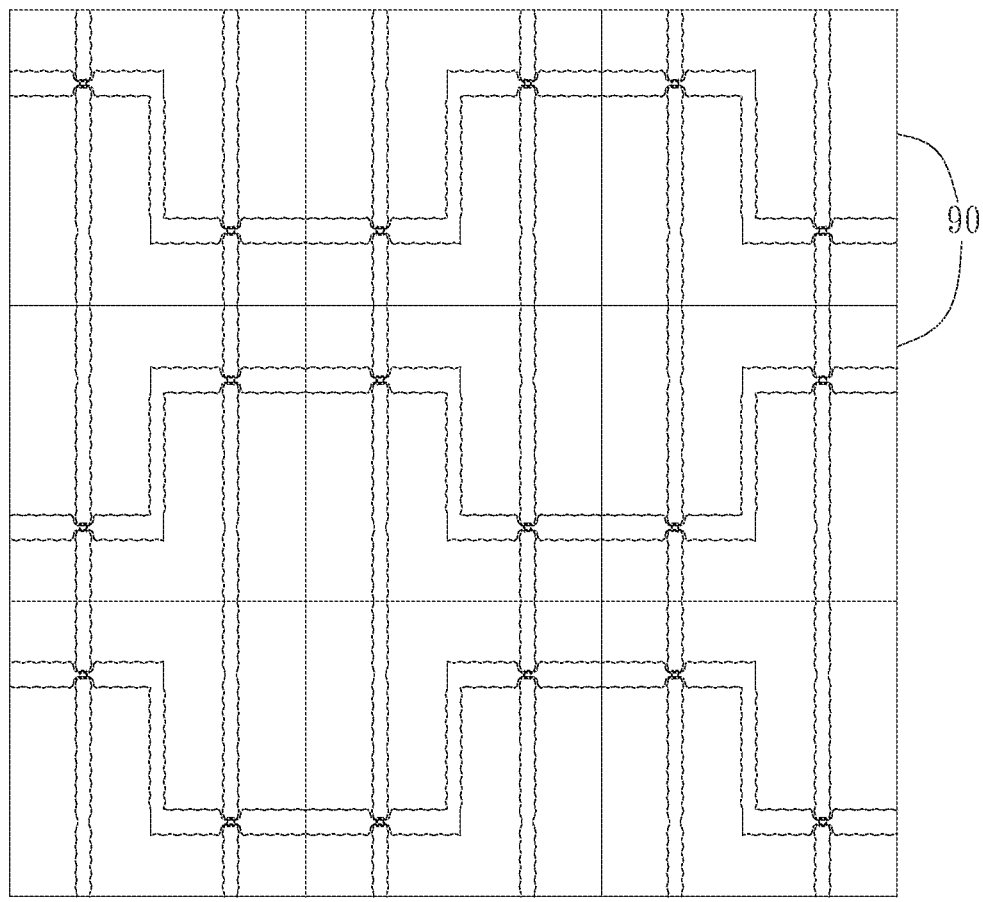
FIG. 9 illustrates a schematic diagram of the on-cell capacitive touch panel having touch sensor patterns arranged in a specific arranging way in another preferred embodiment of the invention.

Furthermore, please refer to FIG. 9. FIG. 9 illustrates a schematic diagram of the on-cell capacitive touch panel 9 having touch sensor patterns 90 arranged in a specific arranging way in another preferred embodiment of the invention. As shown in FIG. 9, in the laminated structure of the on-cell capacitive touch panel 9, the touch sensing module includes nine same touch sensor patterns 90 arranged in a (3*3) type. Each touch sensor pattern 90 will mirror its adjacent touch sensor pattern 90 along the horizontal direction and its adjacent touch sensor pattern 90 along the vertical direction. It should be noticed that geometric lines of the touch sensor patterns 90 shown in FIG. 9 are presented in a sawtooth form, but not limited to this. In fact, the geometric lines of the touch sensor patterns 90 shown in FIG. 9 can be presented in any lines or curves having different curvatures or curved forms or any other regular or irregular geometric lines without any limitations. It can be adjusted based on practical requirements.

In this embodiment, the touch sensor patterns 90 have a single-layer ITO structure. The conductive material of the touch sensor patterns 90 can be transparent thin-film conductive material such as indium tin oxide (ITO), nano silver, or carbon nanotube, but not limited to this. The touch sensor patterns 90 includes at least one first electrode arranged along a first direction and at least one second electrode arranged along a second direction, and the first direction is perpendicular to the second direction.

It should be noticed that the first electrode is a sensing electrode and the second electrode is a driving electrode, or the first electrode is a driving electrode and the second electrode is a sensing electrode. There is no specific limitation.

Figure 10:
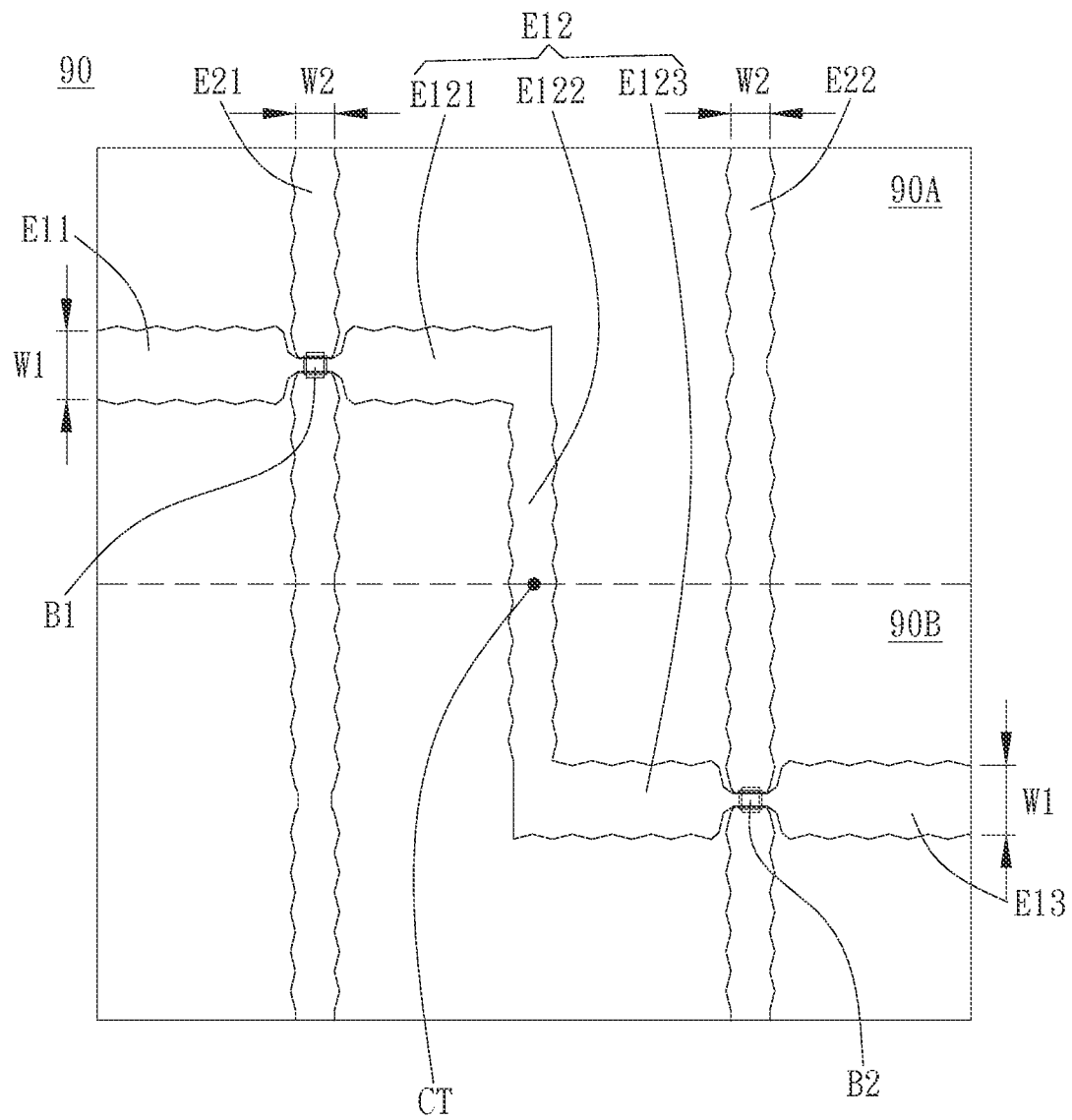
FIG. 10 illustrates a schematic diagram of the touch sensor pattern of FIG. 9.

As shown in FIG. 10, the touch sensor pattern 90 includes a first pattern unit 90A and a second pattern unit 90B. In this embodiment, the first pattern unit 90A and the second pattern unit 90B are symmetrical to a center CT of the touch sensor pattern 90.

The first pattern unit 90A includes first electrodes E11~E12 and second electrodes E21~E22. The first electrode E11 is arranged along the first direction (the horizontal direction); the first electrode E12 is L-shaped and the first electrode E12 includes a horizontal part E121 and a vertical part E122. The horizontal part E121 of the first electrode E12 is coupled to the first electrode E11 above the second electrode E21 via a first bridge structure B1 to cross the second electrode E21 arranged along the second direction (the vertical direction). The vertical part E122 of the first electrode E12 extends to the center CT of the touch sensor pattern 90. Obviously, the first direction (the horizontal direction) is perpendicular to the second direction (the vertical direction).

Similarly, the second pattern unit 90B includes first electrodes E12~E13 and second electrodes E21~E22. The first electrode E13 is arranged along the first direction (the horizontal direction); the first electrode E12 is L-shaped and the first electrode E12 includes the vertical part E122 and a horizontal part E123. The horizontal part E123 of the first electrode E12 is coupled to the first electrode E13 above the second electrode E22 via a second bridge structure B2 to cross the second electrode E22 arranged along the second direction (the vertical direction). The vertical part E122 of the first electrode E12 extends to the center CT of the touch sensor pattern 90. It should be noticed that the first bridge structure B1 in the first pattern unit 90A and the second bridge structure B2 in the second pattern unit 90B are symmetrical to the center of the touch sensor pattern 90, but not limited to this.

In this embodiment, the width W1 of the first electrode E11, the first electrode E13, and the horizontal parts E121 and E123 of the first electrode E12 is 200~600 um; the width W2 of the second electrode E2 and the vertical part E122 of the first electrode E12 is 100~400 um.

Compared with the prior arts, embodiments of the on-cell capacitive touch panel having well-designed touch sensor patterns can effectively inhibit reverse signals and enhance signal uniformity without cover lens and optical clear adhesive (OCA)/optical clear resin (OCR); therefore, the multi-touch sensing performance of the on-cell capacitive touch panel can be enhanced.

Embodiments of the on-cell capacitive touch panel having well-designed touch sensor patterns capable of inhibiting reverse signals have one or more of the following advantages:

(1) Its laminated structure can have no cover lens and OCA/OCR;

(2) Its touch sensor pattern has a single-layer ITO structure and includes sensing electrode and driving electrode, its conductive material can be indium tin oxide (ITO), nano silver, or carbon nanotube.

(3) It can effectively reduce the reversed signals generated due to no cover lens.

(4) The relative configuration relationship between the bridge structure and the extending electrode of its repeated symmetrical pattern units can effectively increase the signal uniformity of the on-cell capacitive touch panel.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A capacitive touch panel having an on-cell type, the capacitive touch panel comprising:
    a laminated structure, comprising:
        a LCD module;
        a touch sensing module, disposed on the LCD module: and a polarizing module, disposed on the touch sensing module;

wherein the touch sensing module comprises a plurality of touch sensor patterns which are identical, a touch sensor pattern of the plurality of touch sensor patterns has a single-layer ITO structure, the touch sensor pattern comprises a first pattern unit and a second pattern unit which are identical, the first pattern unit and the second pattern unit both comprise at least one first electrode, at least one second electrode, and at least two extending electrodes, the at least one first electrode is arranged along a first direction and the at least one second electrode is arranged along a second direction, the first direction is perpendicular to the second direction, the at least one first electrode crosses the at least one second electrode via a bridge structure, the at least two extending electrodes comprise a first extending electrode and a second extending electrode arranged in parallel at two sides of the at least one first electrode respectively, and a first distance between the first extending electrode and the at least one first electrode is equal to a second distance between the second extending electrode and the at least one first electrode.

2. The capacitive touch panel of claim 1, wherein a width of the at least one first electrode is 100~400 um.

3. The capacitive touch panel of claim 1, wherein a width of the at least one second electrode is 200~600 um.

4. The capacitive touch panel of claim 1, wherein a width of the at least two extending electrodes is 20~100 um.

5. The capacitive touch panel of claim 1, wherein the first distance and the second distance are both 20~100 um.

6. The capacitive touch panel of claim 1, wherein the bridge structure is located at centers of the first pattern unit and the second pattern unit.

7. The capacitive touch panel of claim 1, wherein the at least two extending electrodes extend from the at least one second electrode toward an edge of the touch sensor pattern along the first direction.

8. The capacitive touch panel of claim 1, wherein the at least two extending electrodes have single slope or multi-slope.

9. The capacitive touch panel of claim 1, wherein a conductive material of the plurality of touch sensor patterns is indium tin oxide (ITO), nano silver, or carbon nanotube.

10. The capacitive touch panel of claim 1, wherein the first direction is a horizontal direction and the second direction is a vertical direction, or the first direction is the vertical direction and the second direction is the horizontal direction.

11. The capacitive touch panel of claim 1, wherein the at least one first electrode is a sensing electrode and the at least one second electrode is a driving electrode, or the at least one first electrode is the driving electrode and the at least one second electrode is the sensing electrode.

* * * * *